United States Patent
Cho et al.

(10) Patent No.: US 9,699,381 B2
(45) Date of Patent: Jul. 4, 2017

(54) DIGITAL PHOTOGRAPHING MOTION COMPENSATION SYSTEM AND METHOD

(71) Applicant: SAMSUNG ELECTRO-MECHANICS CO., LTD., Suwon-Si (KR)

(72) Inventors: Sang Do Cho, Suwon-Si (KR); Peter Jean Woo Lim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 9 days.

(21) Appl. No.: 14/623,492

(22) Filed: Feb. 16, 2015

(65) Prior Publication Data

US 2015/0304563 A1    Oct. 22, 2015

(30) Foreign Application Priority Data

Apr. 18, 2014  (KR) .................. 10-2014-0046885
Jun. 20, 2014  (KR) .................. 10-2014-0076061

(51) Int. Cl.
*H04N 5/232*    (2006.01)
*G02B 27/64*    (2006.01)

(52) U.S. Cl.
CPC ....... *H04N 5/23287* (2013.01); *G02B 27/646* (2013.01); *H04N 5/23251* (2013.01); *H04N 5/23254* (2013.01); *H04N 5/23258* (2013.01)

(58) Field of Classification Search
CPC .......... H04N 5/23287; H04N 5/23254; H04N 5/23251; H04N 5/23258
See application file for complete search history.

(56) References Cited

U.S. PATENT DOCUMENTS

| | | | | |
|---|---|---|---|---|
| 2002/0163581 | A1* | 11/2002 | Kitazawa | H04N 5/23248 348/208.6 |
| 2005/0018051 | A1* | 1/2005 | Tomita | H04N 5/23248 348/208.4 |
| 2007/0242937 | A1* | 10/2007 | Sano | G03B 17/18 396/55 |
| 2008/0037970 | A1* | 2/2008 | Saito | G03B 5/00 396/55 |

(Continued)

FOREIGN PATENT DOCUMENTS

| | | |
|---|---|---|
| JP | 2009-145852 A | 7/2009 |
| JP | 2009145852 A * | 7/2009 |

(Continued)

OTHER PUBLICATIONS

Korean Office Action issued on May 26, 2015 in counterpart Korean Patent Application No. 10-2014-0076061 (24 pages, with English translation).

*Primary Examiner* — Abdelaaziz Tissire
(74) *Attorney, Agent, or Firm* — NSIP Law

(57) ABSTRACT

A digital photographing system may include a lens unit detecting an image of a subject, and a first processor performing an image compensation data generation process and an optical compensation process in parallel. The optical compensation process may be a process of selectively controlling a movement of the lens unit based on motion data corresponding to a motion of a camera module. The image compensation data generation process may be a process of generating image compensation data corresponding to the image.

29 Claims, 5 Drawing Sheets

(56) References Cited

U.S. PATENT DOCUMENTS

| | | | | |
|---|---|---|---|---|
| 2010/0053343 | A1* | 3/2010 | Kim | H04N 5/23248 |
| | | | | 348/208.4 |
| 2010/0128133 | A1* | 5/2010 | Lee | H04N 5/23248 |
| | | | | 348/208.5 |
| 2010/0149352 | A1 | 6/2010 | Jang et al. | |
| 2013/0182134 | A1* | 7/2013 | Grundmann | H04N 5/23254 |
| | | | | 348/208.6 |

FOREIGN PATENT DOCUMENTS

| KR | 10-2010-0067406 A | 6/2010 |
|---|---|---|
| KR | 10-2010-0104383 A | 9/2010 |

\* cited by examiner

DIGITAL PHOTOGRAPHING MOTION COMPENSATION SYSTEM AND METHOD

CROSS-REFERENCE TO RELATED APPLICATION

This application claims the benefit of Korean Patent Application No. 10-2014-0046885, filed on Apr. 18, 2014, entitled "Digital Photographing System and Controlling Method Thereof" and Korean Patent Application No. 10-2014-0076061, filed on Jun. 20, 2014, entitled "Digital Photographing System and Controlling Method Thereof", both of which are incorporated by reference herein in their entireties.

BACKGROUND

Some embodiments of the present disclosure may relate to a digital photographing system and a method for controlling the same.

Generally, a digital photographing system may process an image received through an image pickup device using a digital signal processor, compress the processed image to generate an image file, and store the generated image file in a memory.

Further, the digital photographing system may display the image of the image file, which is received through the image pickup device or stored in a storage medium, on a display device such as an LCD. However, the digital photographing system such as a camera may be shaken due to motions (hand shaking, and the like) of a user or any disturbance when the user photographs a desired image. Due to the shaking, the image input through the image pickup device is shaken and thus the quality of the image may be degraded.

RELATED ART DOCUMENT

Patent Document (Patent Document 1) Korean Patent Application Publication No. 10-2010-0104383

SUMMARY

Some embodiments of the present disclosure may provide a digital photographing system and a method for controlling the same capable of applying an optical compensation process and an image compensation process in parallel to compensate for a shaking or disturbance of a photographed image, based on motion data of a motion sensor about a motion of a camera when the motion of the camera occurs during a process of photographing a subject.

Some embodiments of the digital photographing system and the method for controlling the same may perform the optical compensation process and the image compensation data generation process in parallel, depending on whether the moving distance of the camera module in each axial direction is within a preset reference range, and may compensate for the shaking of the image due to the motion by selectively applying the optical compensation process under the predetermined condition. The moving distance of the camera module may be calculated based on the motion data corresponding to the motion of the camera module.

Some embodiments of the present disclosure may shorten the image compensation processing time due to the motion and secure the reliability of the image quality, by individually applying the optical compensation processor controlling the movement of the lens unit and the image compensation data generation process generating the image compensation data using the preset synchronization information under the predetermined condition, for the motion (hand shaking or horizontal/vertical movement) which may occur while the image (still or moving picture) is photographed.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
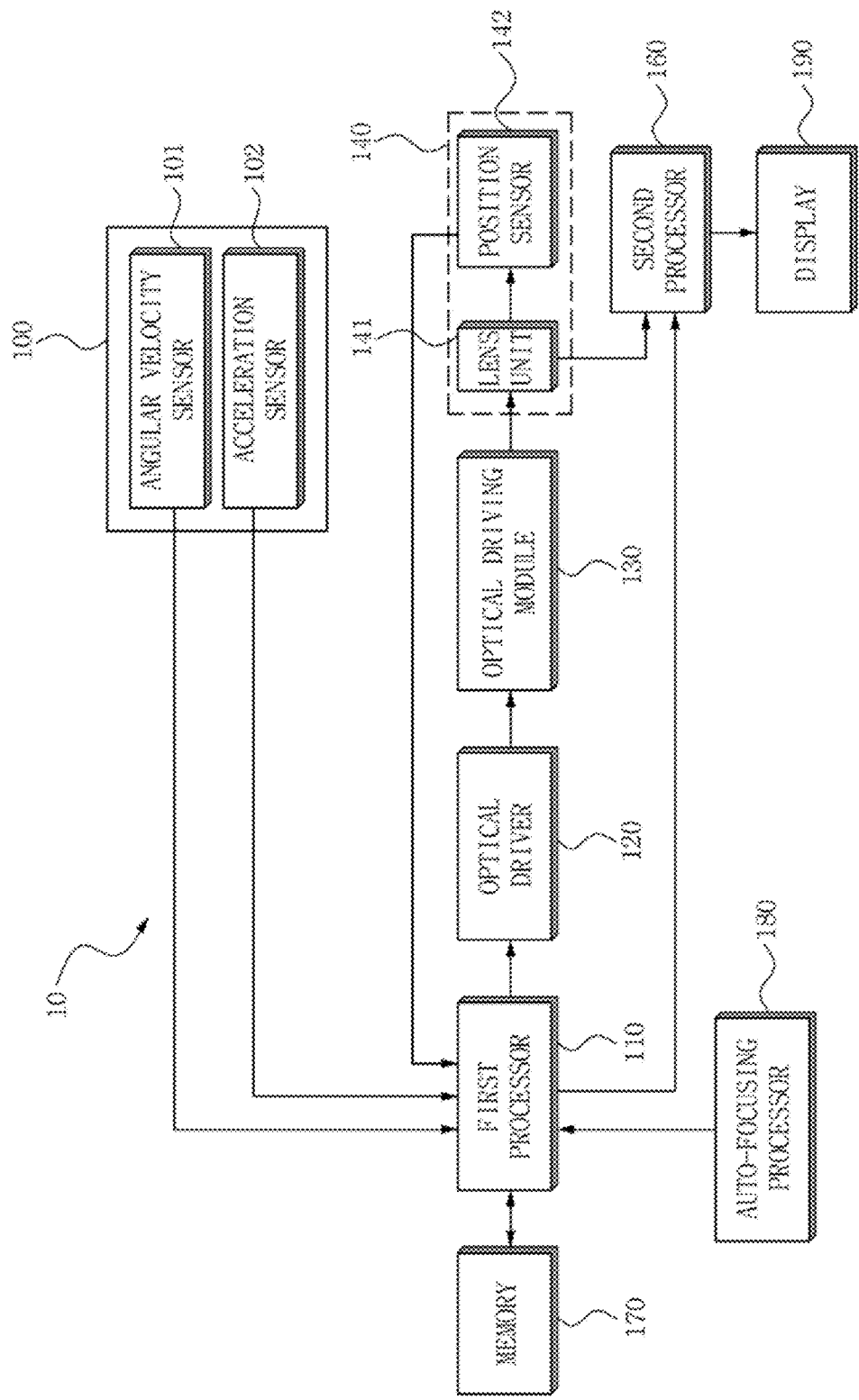
FIG. 1 is a block diagram illustrating a digital photographing system according to an exemplary embodiment of the present disclosure.

The objects, features and advantages of the present disclosure will be more clearly understood from the following detailed description of the exemplary embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. Further, in the description of the present disclosure, when it is determined that the detailed description of the related art would obscure the gist of the present disclosure, the description thereof will be omitted.

Hereinafter, a digital photographing system and a method for controlling the same according to exemplary embodiments of the present disclosure will be described in detail with reference to the accompanying drawings.

Figure 2:
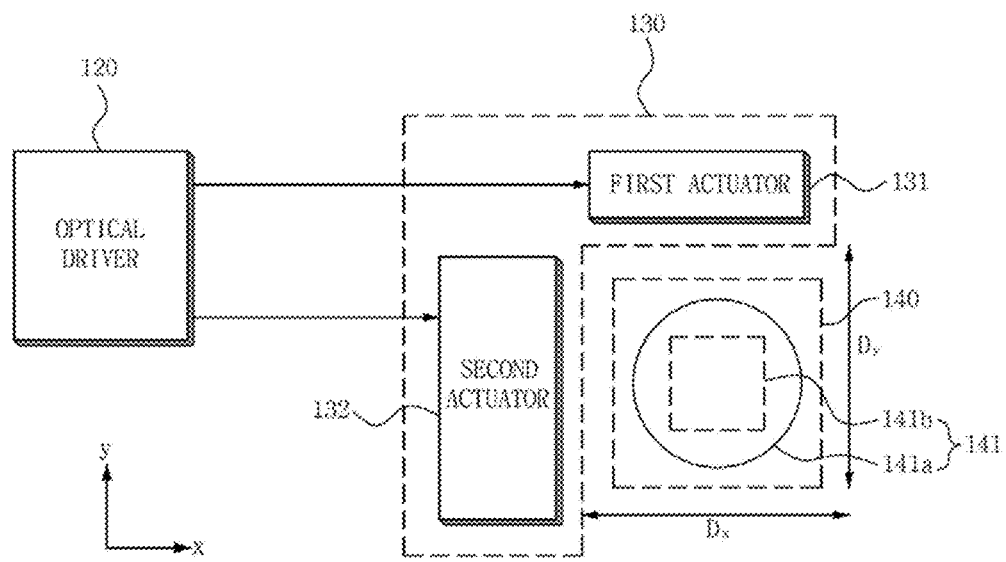
FIG. 2 is a diagram illustrating a configuration of a camera module of the digital photographing system according to an exemplary embodiment of the present disclosure.
Figure 3:
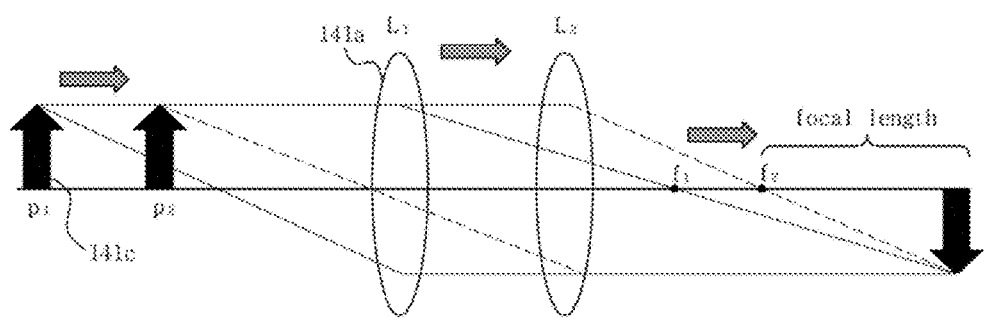
FIG. 3 is a diagram illustrating a function of an auto-focusing processor of the digital photographing system according to an exemplary embodiment of the present disclosure.

FIG. 1 is a block diagram illustrating a digital photographing system according to an exemplary embodiment of the present disclosure, FIG. 2 is a diagram illustrating a configuration of a camera module of the digital photographing system according to the exemplary embodiment of the present disclosure, and FIG. 3 is a diagram illustrating a function of an auto-focusing processor of the digital photographing system according to the exemplary embodiment of the present disclosure.

As illustrated in FIGS. 1 and 2, a digital photographing system 10 according to an exemplary embodiment of the present disclosure may include a camera module 140, a motion sensor 100, a first processor 110, an optical driver 120, an optical driving module 130, a second processor 160, a memory 170, and an auto-focusing processor 180. The digital photographing system 10 may be included, for example, in mobile multi-functional devices, such as a digital camera, a cellular phone, and a tablet computer, or in a laptop computer, a desktop computer, or the like, but the digital photographing system 10 is not limited thereto.

The motion sensor 100 may be provided inside or outside the camera module 140 and may generate or output motion data corresponding to a motion of the camera module 140. The motion sensor 100 may include an angular velocity sensor 101 and an acceleration sensor 102. The angular velocity sensor 101 may sense a change in a rotation component (angular velocity) of the camera module 140, for example, but not limited to, due to hand shaking or disturbance and the like. The acceleration sensor 102 may sense a change in a linear component (velocity), for instance, but not limited to, due to movement in a vertical or horizontal direction of the camera module 140.

For example, 1) the angular velocity sensor 101 may be a gyro sensor which may sense the change in the angular velocity of motions of the camera module 140 in two directions of a yaw axis and a pitch axis to compensate for vertical and horizontal shaking or movement of the camera module 140 due to hand shaking of a user or disturbance, and 2) the acceleration sensor 102 may sense the change in the velocity in the horizontal (x axis) or vertical (y axis) direction of the camera module 140 due to the user's movement or disturbance, which corresponds to a linear component due to the motion of the camera module 140.

The lens unit 141 may include a lens barrel 141a and a position sensor 142. The lens barrel 141a may include an image sensor 141b and a lens group (not illustrated) which optically process light from a subject 141c to detect or capture an image frame of an image such as still or moving picture of the subject 141c. The position sensor 142 may sense a position change of the lens barrel 141a (see FIG. 3).

For instance, the lens group (not illustrated) may include at least one of a zoom lens, a focus lens or a compensation lens. The image sensor 141b may be, for example, but not limited to, a charge coupled device (CCD), a complementary metal-oxide-semiconductor (CMOS) or any device converting an optical signal of light incident through the lens barrel 141a into an electrical analog signal. The position sensor 142 may sense the position change of the lens barrel 141a to transmit current position information of the lens barrel 141a to the first processor 110. The position sensor 142 may be, for instance, but not limited to, a hall sensor (not illustrated) using a hall effect in which a voltage is changed depending on a magnetic field strength to detect a current position of the lens barrel 141.

The optical driver 120 may generate a driving voltage and a control signal of the optical driving module 130 to move the lens unit 141 depending on a control signal input from the first processor 110.

Further, the optical driver 120 may control a drive of the optical driving module 130 based on a switching operation corresponding to the control signal to control a moving range of the lens unit 141. The optical driver 120 may be, for example, but not limited to, a motor drive integrated chip (IC). The optical driver 120 may be embedded in the first processor 110.

In the embodiment, the optical driving module 130 may comprise first and second actuators 131 and 132 including a voice coil motor (VCM) or a piezoelectric device. The first actuator 131 may control a movement of the lens unit 141 in a vertical direction (y-axis direction), and the second actuator 132 may control a movement of the lens unit 141 in the horizontal direction (x-axis direction).

The first processor 110 may perform an image compensation data generation process and an optical compensation process in parallel or simultaneously. For example, the optical compensation process may control the movement of the lens unit 141 based on motion data, and the image compensation data generation process may generate image compensation data corresponding to the image, but not limited thereto. The image compensation data generation process and the optical compensation process may be simultaneously performed.

For instance, the optical compensation process may be selectively performed depending on whether a moving distance in a moving direction (each axial direction such as x-axis or y-axis direction) of the camera module 140 is within a preset reference range and detailed contents thereof will be described below. The moving distance of the camera module 140 may be calculated based on, for example, but not limited to, motion data (data for a change in acceleration or angular velocity) corresponding to a motion of the camera module 140.

Further, when performing the image compensation data generation process, the first processor 110 may generate the image compensation data synchronized with each image frame of the image based on preset synchronization information. For instance, the image compensation data $I_D$ (see FIG. 6) may include dummy data configured of null data, motion data depending on a change in acceleration, and metadata configured of focus information of the lens unit 141.

Figure 5:
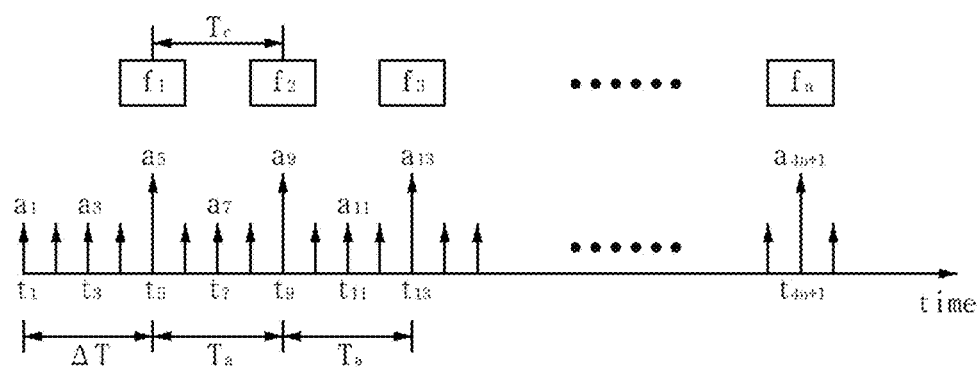

For example, the first processor 110 may synchronize 1) the dummy data with the image frame acquired in a section or period in which the optical compensation process is performed and 2) the metadata with the image frame acquired in a section or period in which the optical driving process is not performed, by using the synchronization information (the motion data and the detection timing of the focus information of the lens unit 141, see FIG. 5).

Further, the optical driving processor or the first processor 110 may store the image compensation data $I_D$ in the memory 170 or transmit the image compensation data $I_D$ to the application processor or the second processor 160.

When performing the optical compensation process, the first processor 110 may selectively perform the optical compensation process depending on whether the moving distance of the camera module 140 in the moving direction (each axial direction such as x-axis or y-axis direction) which may be calculated based on the motion data is within the preset reference range.

The motion data may include, for instance, but not limited to, data for the rotation component (angular velocity) of the camera module 140 due to hand shaking of a user or disturbance and the linear component (acceleration) for a motion of the camera module 140 in the horizontal or vertical direction.

When the moving distance of the camera module 140 is within the reference range, the first processor 110 may perform the optical compensation process controlling the movement of the lens unit 141 so as to be able to compensate for the motion of the camera module 140. For example, the reference range may be a maximum movable range $D_X$ or $D_Y$ of the lens unit in a horizontal (x-axis) direction or a vertical (y-axis) direction, but is not limited thereto.

In detail, the first processor 110 may control the movement of the lens barrel 141a based on the position information of the lens barrel 141a which is transmitted from the position sensor 142 so as to be able to compensate for shaking of an image due to the motion of the camera module 140. For example, the first processor 110 may generate a control signal to move the lens barrel 141a in an opposite direction to the moving direction of the camera module 140 as much as the moving distance of the camera module 140, and transmit the generated control signal to the optical driver 120.

The optical driver 120 may generate the driving voltage and the control signal of the optical driving module 130 to move the lens unit 141 depending on or responding to the control signal transmitted from the first processor 110. Further, the optical driver 120 may control the driving of the optical driving module 130 based on the switching operation corresponding to the control signal to move the lens unit 141.

Therefore, it is possible to detect or capture the image frame obtained by compensating for the shaking or disturbance due to the motion of the camera module 140 using the lens unit 141 in the section or period in which the optical compensation process is performed.

The second processor 160 may use the image compensation data transmitted from the first processor 110 to calculate the moving pixel information on the display 190 between the respective image frames and then may compensate for the shaking or disturbance of the image due to the motion of the camera module 140 based on the calculated moving pixel information.

In detail, the second processor 160 may use the image compensation data such as dummy data and metadata acquired based on the synchronization information with the image frame configuring the image to calculate the moving pixel information between the respective image frames, and compensate for the shaking disturbance of the image due to the motion of the camera module 140. For example, the second processor 160 may be an application processor which is equipped in a mobile phone, and the like and may include an image sensing processor (ISP).

The auto-focusing processor 180 may calculate focus information (including a focal length) on the respective image frames of the subject acquired through the lens unit 141, and may transmit the focus information to the first processor 110. The focus information may also be detected by a proximity sensor and/or an optical or acoustic means.

For instance, as illustrated in FIG. 3, the auto-focusing processor 180 may control a position of a focus f to move from $f_1$ to $f_2$ so as to definitely project an image of a subject on the image sensor 141b when a position of a subject 141c moves from P1 to P2 or when a position of the lens barrel 141a moves from L1 to L2, and may calculate the focus information such as the focal length which is a distance between the focus f and the image of the subject projected on the image sensor 141b and then transmit the focus information to the first processor 110.

The memory 170 may store the image compensation data generated by the first processor 110 and/or the synchronization information established or generated during calibration. The memory 170 may be, for example, but not limited to, a volatile memory such as a static random access memory (SRAM) and a dynamic random access memory (DRAM) or a non-volatile memory such as a read-only memory (ROM) and a flash memory.

The display 190 may be a display device visually outputting data on a screen and may be, for instance, a cathode ray tube (CRT), a liquid crystal display (LCD), a plasma display panel (PDP), a light emitting diode (LED), and an organic light emitting diode (OLED), but is not necessarily limited thereto.

The first processor 110, the application processor or the second processor 160, and the auto-focusing processor 180 which are described above may include an algorithm for performing the foregoing functions and may be implemented by firmware, software, or hardware (for example, semiconductor chip or application-specific integrated circuit).

Hereinafter, the calibration (preprocessing) process of the digital photographing system according to the exemplary embodiments of the present disclosure will be described in more detail with reference to FIGS. 4 and 5.

Figure 4:
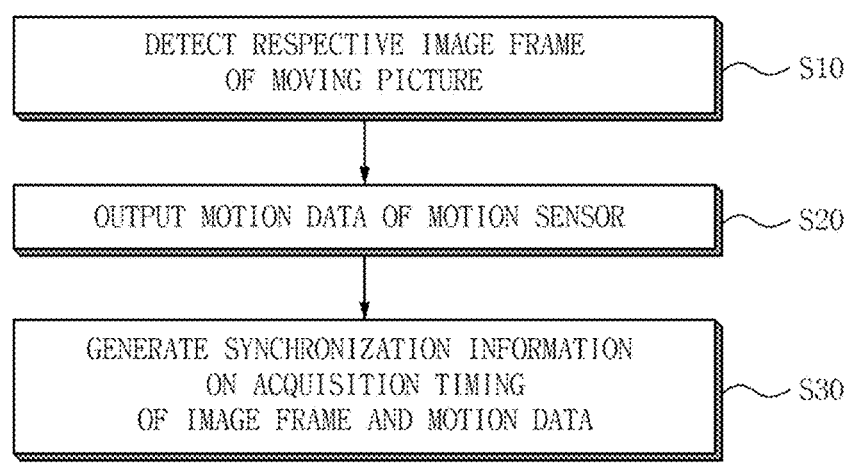
FIGS. 4 and 5 are diagrams illustrating a calibration (pre-processing) process according to an exemplary embodiment of the present disclosure.

FIG. 4 is a flow chart illustrating the calibration process of the digital photographing system according to an exemplary embodiment of the present disclosure, and FIG. 5 is a diagram illustrating that the synchronization information is detected by the calibration of the digital photographing system according to an exemplary embodiment of the present disclosure.

First, as illustrated in FIG. 4, the calibrations (preprocessing) of the digital photographing system according to the exemplary embodiment of the present disclosure may include at least one or more steps of 1) detecting, capturing or sensing the respective image frames of the moving picture (or still image) using the lens unit 141 (S10), 2) acquiring the motion data output from the motion sensor 100 (S20), and 3) calculating the synchronization information on acquisition timing of the image frame and the motion data (S30). Here, the calibration may be performed once at an early stage and then be stored in the memory 170, the first processor 110, or the like and thus may be repeatedly used.

For example, as illustrated in FIG. 5, 1) the respective image frames $f_1$ to $f_n$ configuring the moving picture be detected, captured or sensed by the lens unit 141. Here, a photographing speed (detection speed and period $T_C$ of the respective image frames) of the moving picture may be variously configured depending on a photographing mode of the moving picture (for example, 30 frames per second (fps) or 40 fps).

2) The motion sensor 100 may output the motion data $a_1$ to $a_n$ (preferably, data for the change in the angular velocity detected by the gyro sensor) due to or corresponding to the motion of the camera module 140 which may occur during the photographing process of the moving picture at a constant speed. Here, the output speed of the motion data $a_1$ to $a_n$ may be changed depending on the setting of the motion sensor 100.

3) From the motion data $a_1$ to $a_n$ output from the motion sensor 100, detection timings $t_1$ to $t_{4n+1}$ at which motion data $a_5$ to $a_{4n+1}$ most accurately representing the movement of the image frames $f_1$ to $f_n$ due to the motion of the camera module 140 is detected may be calculated and the detection timings $t_1$ to $t_{4n+1}$ may have a predetermined period $T_a$. $\Delta T$ of FIG. 5 means a delay time before synchronization for the motion data which may occur due to a difference between the output speed of the motion data of the motion sensor 100 and the photographing speed of the image starts.

Here, the detection timing may be variously configured depending on the photographing mode (for example, 30 fps) of the moving picture, which is only an example, and therefore the detection timing is not limited to the description above.

Therefore, synchronization information (detection speed (for example, 30 fps) of the image frame of the moving picture and the detection timings $t_5$ to $t_{4n+1}$ of the motion data corresponding thereto) on extraction timing of the motion data and timing at which the respective image frames $f_1$ to $f_n$ of the moving picture may be acquired, is acquired by the calibration (preprocessing) process.

Hereinafter, the digital photographing system and the method for controlling the same according to exemplary embodiments of the present disclosure will be described in more detail with reference to FIGS. 1, 2 and 5 to 8.

Figure 6:
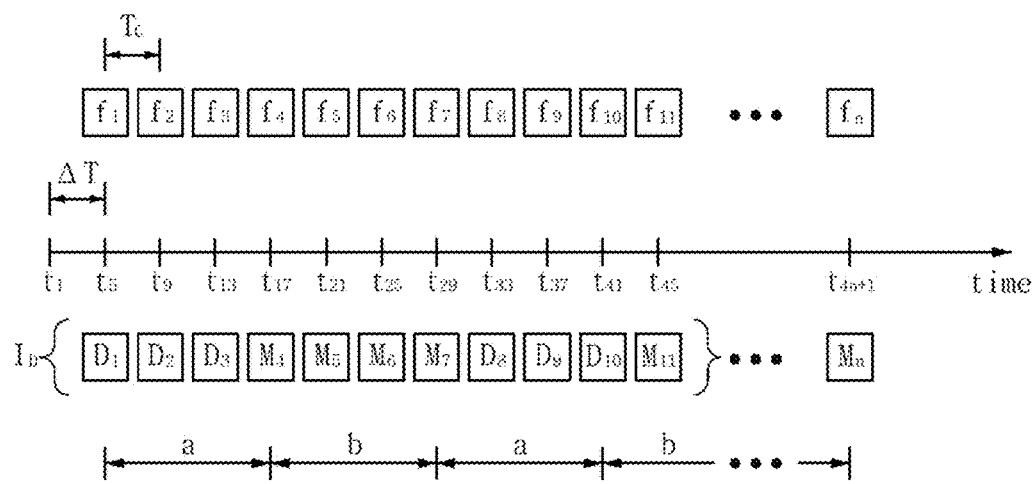
FIG. 6 is a diagram illustrating an image compensation process in a first processor according to an exemplary embodiment of the present disclosure.
Figure 7:
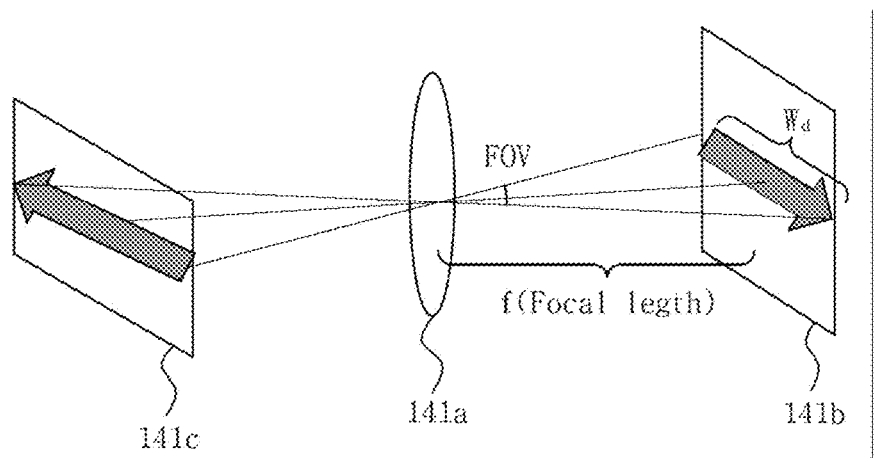
FIG. 7 is a diagram illustrating a process of calculating moving pixel information between image frames in an application processor according to an exemplary embodiment of the present disclosure.
Figure 8:
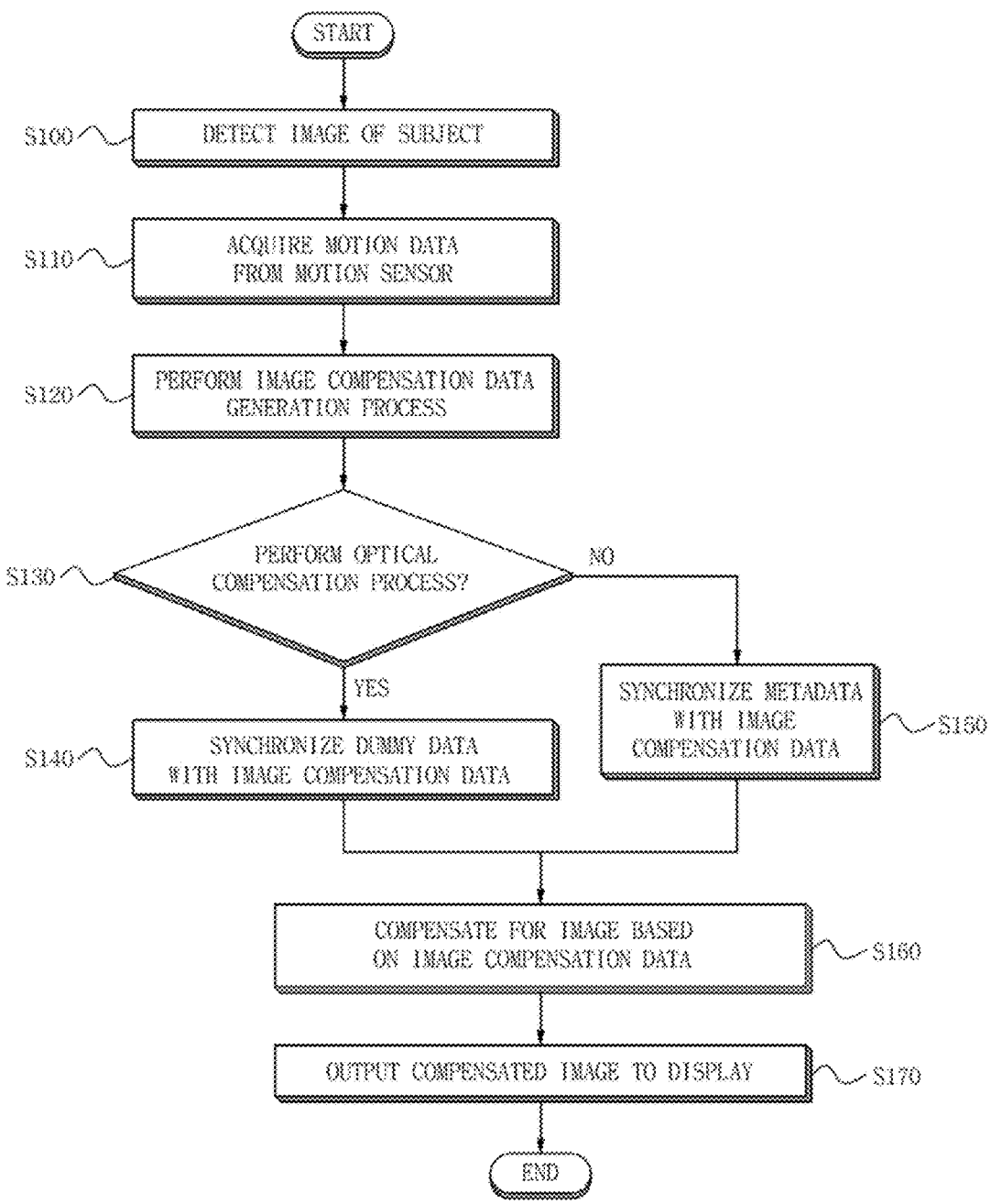
FIG. 8 is a flow chart illustrating a method for controlling a digital photographing system according to an exemplary embodiment of the present disclosure.

FIG. 6 is a diagram illustrating an image compensation data generation process of a digital photographing system according to an exemplary embodiment of the present disclosure, FIG. 7 is a diagram illustrating a process of calculating moving pixel information between image frames configuring an image in the digital photographing system according to an exemplary embodiment of the present disclosure, and FIG. 8 is a flow chart illustrating a method for controlling a digital photographing system according to an exemplary embodiment of the present disclosure.

First, as illustrated in FIGS. 1 and 8, the digital photographing system 10 and a method for controlling the same according to exemplary embodiments of the present disclosure may perform 1) photographing (detecting) the respective image frames configuring the image (still or moving picture) of the subject 141c by the lens unit 141 (S100). The detection speed and period of the image frame may be variously set depending on the photographing mode of the image. The photographed image frame of the moving picture may be transmitted to the second processor 160 through the lens unit 141.

Next, 2) when the motion (hand shaking, horizontal or vertical movement or any disturbance) of the camera module 140 occurs while the image of the subject 141c is photographed, captured or sensed (detected) by the lens unit 141, the motion data for the change in the angular velocity (rotation component in a yaw-axis or pitch-axis direction) due to the hand shaking among the motions and the acceleration (change in the velocity in the horizontal (x-axis) or vertical (y-axis) direction) caused by the linear motion in the horizontal or vertical direction among the motions may be output from the motion sensor 100 (S110).

Next, 3) the first processor 110 may perform the image compensation data generation process which may generate the image compensation data (configured of the dummy data and the metadata) synchronized with the image frame of the moving picture based on the synchronization information (synchronization information (detection timing of the motion data) corresponding to the photographing speed (for instance, 30 fps or 50 fps) of the current moving picture, among the detection timings $t_5$ to $5_{4n+1}$ of the motion data) which is preset by the calibration (S120).

Further, 4) the first processor 110 may use the motion data for the angular velocity (rotation component in a yaw-axis or a pitch-axis direction) and the acceleration (change in the velocity in the horizontal (x-axis) or vertical (y-axis) direction) which are applied from the motion sensor 100 to calculate the actual moving direction and the moving distance of the camera module 140 in the horizontal (x-axis) or vertical (y-axis) direction, thereby determining whether to perform the optical compensation process (S130).

For example, the first processor 110 may determine whether the moving distance of the camera module 140 in the horizontal (x-axis) or vertical (y-axis) direction is within the preset reference range (for instance, but not limited to, maximum movable range of the lens unit 141 in a horizontal ($D_X$) direction and a vertical ($D_Y$) direction).

Further, i) when the moving distance of the camera module 140 is within the reference range, the first processor 110 may receive the current position information of the lens barrel 141a from the position sensor 142. ii) the first processor 110 may control the movement of the lens barrel 141a based on the position information to compensate for the shaking of the image depending on the motion of the camera module 140. For example, the first processor 100 may generate the control signal to move the lens unit 141 in the opposite direction to the motion direction of the camera module 140 as much as the actually moving distance of the camera module 140 and transmit the generated control signal to the optical driver 120.

iii) The optical driver 120 may generate the driving current and the control signal of the optical driving module 130 based on the control signal, and then use the control signal to control the driving of the optical driving module (for instance, but not limited to, voice coil motor or piezoelectric device) 130, thereby performing the optical driving process controlling the moving range of the lens unit 141.

Here, the first actuator 131 may control the movement of the lens unit 141 in the vertical direction (y-axis direction), and the second actuator 132 may control the movement of the lens unit 141 in the horizontal direction (x-axis direction).

The first processor 110 may synchronize i) the dummy data with the image frame (hand shaking compensated image frame by the optical compensation process) of the image acquired in the section in which the optical compensation is performed, based on the synchronization information such as detection timing of the motion data corresponding to the photographing speed of the currently photographing moving picture which is set in the calibration in the generating of the image compensation data (S140).

Further, the first processor may synchronize ii) the metadata with the image frame of the image acquired in the section in which the optical compensation is not performed (S150). Here, the dummy data may be configured of the null data (negligible value or meaningless value) and the metadata may be configured of the motion data (for example, data for the change in the acceleration) of the respective image frames of the photographing moving picture and the focus information (such as focal length) of the lens unit 141.

The auto-focusing processor 180 may calculate the focus information (for example, focal length) of the lens unit 141 at the image frame acquisition timing $t_1$ to $t_{4n+1}$ to transmit the focus information (for instance, focal length) to the first processor 110.

For example, as illustrated in FIG. 6, 1) the respective image frames $f_1$ to $f_n$ of the moving picture which are detected, captured or sensed at a constant photographing speed (for example, 30 fps) by the lens unit 141 may be transmitted to the second processor 160, and 2) the first processor 110 may determine whether the moving distance of the camera module 140 in the horizontal (x-axis) or vertical (y-axis) direction is within the preset reference range (for instance, but not limited to, maximum movable range of the lens unit 141 in the horizontal ($D_X$) and vertical ($D_Y$) directions as illustrated in FIG. 2) based on the motion data (e.g. data for the change in the acceleration and the change in the angular velocity) corresponding to the motion of the camera module 140 to determine whether to perform the optical driving process.

3) The first processor 110 may perform the image compensation process, which may generate the image compensation data $I_D$ configured of the dummy data and metadata synchronized with the image frame based on the synchronization information (for instance, but not limited to, detection timings $t_5$, $t_9$, and $t_{13}$ to $t_{4n+1}$ of the motion data) corresponding to the photographing speed of the moving picture, in parallel.

For example, i) the dummy data $D_1$, $D_2$, $D_3$, ..., $D_n$ may be synchronized based on the synchronization information (for instance, detection timings $t_5$, $t_9$, $t_{13}$ to $t_{4n+1}$) for the image frame of the image acquired in the section or period (for example, section a or when the moving distance of the camera module 140 in the horizontal (x-axis) or vertical (y-axis) direction is within the preset reference range) in which the optical compensation is performed.

ii) The metadata may be synchronized with the image frame of the image acquired in a section (for instance, section b or when the moving distance of the camera module 140 in the horizontal (x-axis) or vertical (y-axis) direction exceeds or is out of the preset reference range) in which the optical compensation is not performed based on the synchronization information (for example, metadata $M_4$, $M_5$, and $M_6$ to $M_n$ (motion data (data for the change in the acceleration) for the respective image frame of the photographing moving picture) based on the detection timings $t_5$, $t_9$, $t_{13}$ to $t_{4n+1}$ and the focus information (such as focal length of the lens unit 141), may be synchronized.

iii) Therefore, depending on whether the optical driving process is performed while all the image frames $f_1$ to $f_n$ of the image are detected, sensed or captured by the lens unit 141, the image compensation data $I_D = D_1, D_2, D_3, ..., M_4, M_5$, and $M_6$ to $M_N$ for the image generated by the image compensation data generation process may be configured of the dummy data and the metadata synchronized with the image frame based on the preset synchronization information corresponding to the photographing speed of the moving picture.

Further, when the photographing of the image ends, the first processor 110 may store the image compensation data for the image in the memory 170 or transmit the image compensation data to the second processor 160.

Next, the second processor 160 may use the image compensation data transmitted from the first processor 110 to calculate the moving pixel information between the respective image frames configuring the image (S160).

For example, the second processor 160 may use the image frame configuring the image and the motion data for the change in the acceleration of the motion sensor 100 and the metadata $M_4$, $M_5$, and $M_6$ to $M_N$ including the focus information of the lens unit 141 which are synchronized at the acquisition timing of the respective image frames to calculate the moving pixel information between the respective image frames.

For instance, as illustrated in FIG. 7, the moving pixel information between the image frames in the second processor 160 may be calculated by the following Equations 1 to 4, in which $W_d$ represents a horizontal distance or width of the image sensor 141b, a field of view (FOV) represents a viewing angle, $R_S$ represents a screen resolution (graphic setting value) of a display, $\delta_p$ represents the number of moving pixels of the respective image frames on the display, and $\delta_S$ represents the moving distance of the camera module 140.

Here, the moving pixel information between the image frames which is calculated using the motion data (data acquired by the acceleration sensor 102) for the change in the acceleration and the focal length of the lens unit 141 may include the number of moving pixels and the moving direction.

$$W_d = 2 * f * \tan(FOV/2)| \quad \text{[Equation 1]}$$

$$\delta_p : \delta_S = R_S : W_d \quad \text{[Equation 2]}$$

$$\delta_S = \iint (\delta^2 s / \delta t^2) \quad \text{[Equation 3]}$$

$$\delta_S = \delta_d * R_S / (2 * f * \tan(FOV/2)) \quad \text{[Equation 4]}$$

Next, since the moving pixel information between the image frames calculated by the second processor 160 may be stored in the memory 170 and the like, and the compensated image may be output through a dedicated player and the like by using the image and the moving pixel information corresponding to the image, it is possible to more reduce power consumption and processing time for image compensation than a post-compensation method for photographing an image and then using an image processing technique.

As described above, the digital photographing system according to the exemplary embodiment of the present disclosure may apply the optical compensation process and the image compensation data generation process in parallel depending on the motion (hand shaking, horizontal/vertical movement or any disturbance) which may occur while the still or moving picture is photographed, thereby shortening the image compensation processing time by the motion and securing the reliability of the image compensation.

Although the preferred embodiments of the present disclosure have been disclosed for illustrative purposes, they are for specifically explaining the present disclosure and thus a digital photographing system and a method for controlling the same according to the present disclosure are not limited thereto, but those skilled in the art will appreciate that various modifications, additions and substitutions are possible, without departing from the scope and spirit of the disclosure as disclosed in the accompanying claims.

Accordingly, any and all modifications, variations or equivalent arrangements should be considered to be within the scope of the disclosure, and the detailed scope of the disclosure will be disclosed by the accompanying claims.

What is claimed is:

1. A digital photographing system, comprising:
a lens unit configured to detect an image of a subject; and
a first processor configured to selectively control a movement of the lens unit, based on motion data corresponding to a motion of a camera module, generate image compensation data corresponding to the image, and generate a control signal to move the lens unit in response to the motion data indicating a moving distance of the camera module being within a maximum movable range,
wherein:
the first processor generates the image compensation data, which is synchronized with respective image frames of the image, based on synchronization information,
the image compensation data includes dummy data, comprising null data, and metadata, and
the metadata includes the motion data, comprising information on a change in acceleration, and focus information of the lens unit.

2. The digital photographing system of claim 1, wherein the first processor selectively controls the movement of the lens unit depending on whether the moving distance of the camera module in a moving direction, which is calculated based on the motion data, is within the maximum movable range.

3. The digital photographing system of claim 2, wherein the first processor controls the movement of the lens unit based on position information of the lens unit when the moving distance of the camera module is within the maximum movable range.

4. The digital photographing system of claim 3, wherein the maximum movable range is a maximum movable range of the lens unit.

5. The digital photographing system of claim 2, further comprising:
an optical driving module configured to move the lens unit; and
an optical driver configured to generate a driving voltage and a control signal depending on a control signal for the movement of the lens unit transmitted from the first processor and apply the generated driving voltage and control signal to the optical driving module.

6. The digital photographing system of claim 1, wherein:
the dummy data are synchronized with the image frames, acquired in relation to a set of image frames in which the first processor controls the movement of the lens unit based on the motion data, using the synchronization information, and
the metadata are synchronized with the image frames acquired in relation to a set of image frames in which the first processor does not control the movement of the lens unit based on the motion data.

7. The digital photographing system of claim 1, further comprising:
a second processor configured to calculate moving pixel information between respective image frames configuring the image by using the image compensation data generated by the first processor and compensate for the image based on the moving pixel information.

8. The digital photographing system of claim 7, further comprising:
an auto-focusing processor configured to calculate focus information of the lens unit and transmit the focus information to the first processor.

9. The digital photographing system of claim 8, further comprising:
a memory configured to store the image compensation data generated by the first processor; and
a display configured to output the image compensated by the second processor.

10. The digital photographing system of claim 1, wherein the motion data include:
data representing a change in a rotation component of the camera module; and
data representing a change in a linear component of the camera module.

11. The digital photographing system of claim 1, wherein the lens unit is comprised in the camera module.

12. The digital photographing system of claim 1, wherein the first processor combines controlling the movement of the lens unit based on the motion data and generating the image compensation data corresponding to the image.

13. A method for controlling a digital photographing system, comprising:
detecting an image of a subject;
selectively controlling a movement of a lens unit based on motion data corresponding to a motion of a camera module; and
generating image compensation data corresponding to the image,
wherein the controlling of the movement of the lens unit and the generating of the image compensation data are performed in parallel, and
wherein the lens unit is controlled to move in response to the motion data indicating a moving distance of the camera module being within a maximum movable range, and
wherein the generating of the image compensation data includes:
synchronizing dummy data with an image frame of the image acquired in relation to a set of image frames in which the controlling of the movement of the lens unit is performed; and
synchronizing metadata with an image frame of the image acquired in relation to a set of image frames in which the controlling of the movement of the lens unit is not performed,
wherein the dummy data comprises null data, and the metadata comprises the motion data, including information on a change in acceleration, and focus information of the lens unit.

14. The method of claim 13, wherein the controlling of the movement of the lens unit includes:
calculating a moving direction and the moving distance of the camera module based on the motion data;
determining whether the moving distance is within the maximum movable range; and
controlling a moving distance and a moving direction of the lens unit when the moving distance is within the maximum movable range.

15. The method of claim 14, wherein the focus information of the lens unit is calculated and transmitted by an auto-focusing processor.

16. The method of claim 13, further comprising:
receiving the image compensation data;
calculating the number of moving pixels for respective image frames configuring the image by using the image compensation data; and
compensating for the image based on the number of moving pixels.

17. The method of claim 13, further comprising:
prior to the detecting of the image, detecting, by the lens unit, respective image frames for the image of the subject;
detecting the motion data corresponding to the motion of the camera module from a motion sensor; and
calculating synchronization information on an acquisition timing of the image frame and the motion data.

18. A digital photographing system, comprising:
a lens unit configured to detect an image of a subject; and
a first processor configured to calculate a moving direction and a moving distance of a camera module based on motion data corresponding to a motion of the camera module, determine whether the moving distance of the camera module in the moving direction is within a maximum movable range, and generate a control signal to move the lens unit in response to the moving distance of the camera module being within the maximum movable range,
wherein:
the first processor generates image compensation data, which is synchronized with respective image frames of the image, based on synchronization information,
the image compensation data includes dummy data, comprising null data, and metadata, and the metadata includes the motion data, comprising information on a change in acceleration, and focus information of the lens unit.

19. The digital photographing system of claim 18, wherein:
the first processor generates the metadata including the motion data when the moving distance of the camera module is out of the maximum movable range, and controls a movement of the lens unit when the moving distance of the camera module is within the maximum movable range, and
the lens unit detects a motion of an image frame compensated by controlling the movement of the lens unit.

20. The digital photographing system of claim 19, wherein the first processor controls the movement of the lens unit based on position information of the lens unit when the moving distance of the camera module is within the maximum movable range.

21. The digital photographing system of claim 19, wherein the metadata include the motion data comprising information on a change in acceleration corresponding to the image frame acquired in a section in which the first processor does not control the movement of the lens unit and focus information of the lens unit, based on preset synchronization information.

22. The digital photographing system of claim 21, further comprising:
a second processor configured to calculate moving pixel information on the respective image frame using the metadata and compensating for the image based on the moving pixel information.

23. The digital photographing system of claim 22, further comprising:
an auto-focusing processor configured to calculate the focus information of the lens unit and transmitting the focus information to the first processor.

24. A digital photographing system, comprising:
a camera module comprising a lens unit sensing an image; and
a processor configured to selectively control a movement of the lens unit in response to a motion of the camera module, generate data for compensating for the sensed image, and generate a control signal to move the lens unit in response to a moving distance of the camera module being within a maximum movable range,
wherein:
the processor generates image compensation data, which is synchronized with respective image frames of the image, based on synchronization information,
the image compensation data includes dummy data, comprising null data, and metadata, and
the metadata includes motion data, comprising information on a change in acceleration, and focus information of the lens unit.

25. The digital photographing system of claim 24, wherein the processor combines controlling the movement of the lens unit and generating the data for compensating the sensed image.

26. The digital photographing system of claim 24, wherein the processor selectively controls the movement of the lens unit depending on a moving distance of the camera module.

27. The digital photographing system of claim 26, wherein the processor controls the movement of the lens unit based on position information of the lens unit when the moving distance of the camera module is within the maximum movable range, and the processor generates the data comprising information on a change in acceleration and focus information of the lens unit when the moving distance of the camera module is out of the maximum movable range.

28. The digital photographing system of claim 27, wherein the maximum movable range is a movable range of the lens unit.

29. The digital photographing system of claim 24, wherein the processor compensates for the image based on moving pixel information between image frames of the sensed image.

* * * * *